United States Patent
Wu (10) Patent No.: US 6,690,368 B2
(45) Date of Patent: Feb. 10, 2004

(54) METHOD AND APPARATUS FOR MEASURING A FULL FRAME SIZE FROM A DISPLAY SIGNAL

(75) Inventor: Kao-Yang Wu, Taoyuan (TW)

(73) Assignee: Benq Corporation, Kweishan Taoyuan (TW)

( * ) Notice: Subject to any disclaimer, the term of this patent is extended or adjusted under 35 U.S.C. 154(b) by 207 days.

(21) Appl. No.: 10/026,822

(22) Filed: Dec. 27, 2001

(65) Prior Publication Data

US 2002/0089522 A1 Jul. 11, 2002

(30) Foreign Application Priority Data

Jan. 5, 2001 (TW) ........................................ 90100317 A (51) Int. Cl.[7] ................................................ G09G 5/00
(52) U.S. Cl. ...................... 345/213; 348/581; 345/698
(58) Field of Search .......................... 345/10, 211, 212, 345/213, 698, 204; 348/581, 582, 561, 562, 513, 516, 517, 500

(56) References Cited

U.S. PATENT DOCUMENTS

| | | | | |
|---|---|---|---|---|
| 5,592,194 A | * | 1/1997 | Nishikawa | 345/667 |
| 5,771,040 A | * | 6/1998 | Kim | 345/213 |
| 5,844,539 A | * | 12/1998 | Kitagawa | 345/100 |
| 6,008,854 A | * | 12/1999 | Shimizu | 348/445 |
| 6,236,388 B1 | * | 5/2001 | Iida et al. | 345/698 |
| 6,597,373 B1 | * | 7/2003 | Singla et al. | 345/698 |

* cited by examiner

*Primary Examiner*—Kent Chang
(74) *Attorney, Agent, or Firm*—Rabin & Berdo, P.C.

(57) ABSTRACT

An apparatus for measuring a full frame size from a digital display signal by a data enable signal and a method therefor. The apparatus includes a timing control device and a multiplexing device. The timing control device has multiple input terminals and a control signal output terminal. Each of the input terminals is capable of being coupled to a display bit of a primary color signal. The timing control device outputs a control signal through the control signal output terminal. When the timing control device is to perform display adjustment, the timing control device outputs the data enable signal to the multiplexing device and the multiplexing device applies the data enable signal to the timing control device. According to the data enable signal, the full frame size and position can be obtained. After the display adjustment, the timing control device changes the logic state of the data enable signal so that the timing control device can receive the primary color signal with its original display bit arrangement. Thus, the frames indicated by the display signal can be actually displayed according to the display adjustment.

18 Claims, 6 Drawing Sheets

METHOD AND APPARATUS FOR MEASURING A FULL FRAME SIZE FROM A DISPLAY SIGNAL

This application incorporates by reference of Taiwan application Serial No. 090100317, filed on Jan. 5, 2001.

BACKGROUND OF THE INVENTION

1. Field of the Invention

The invention relates in general to a method for measuring a full frame size from a display signal and an apparatus therefor, and more particularly to a method for measuring a fill frame size from a display signal by a data enable signal and an apparatus therefor.

2. Description of the Related Art

For maintaining the display quality, a display monitor, such as a cathode ray tube (CRT) or liquid crystal display (LCD) monitor, is required to adjust the size and position of the full frame indicated by a display signal applied to the display monitor. In order to display frames indicated by the display signal in a proper position on the screen of the display monitor, the display monitor requires determining the display parameters such as a full frame size. For illustrating the problem behind a conventional approach, the following description will explain the circuitry of the display monitor, the display signal, and the determination of the full frame size and position.

Figure 1:
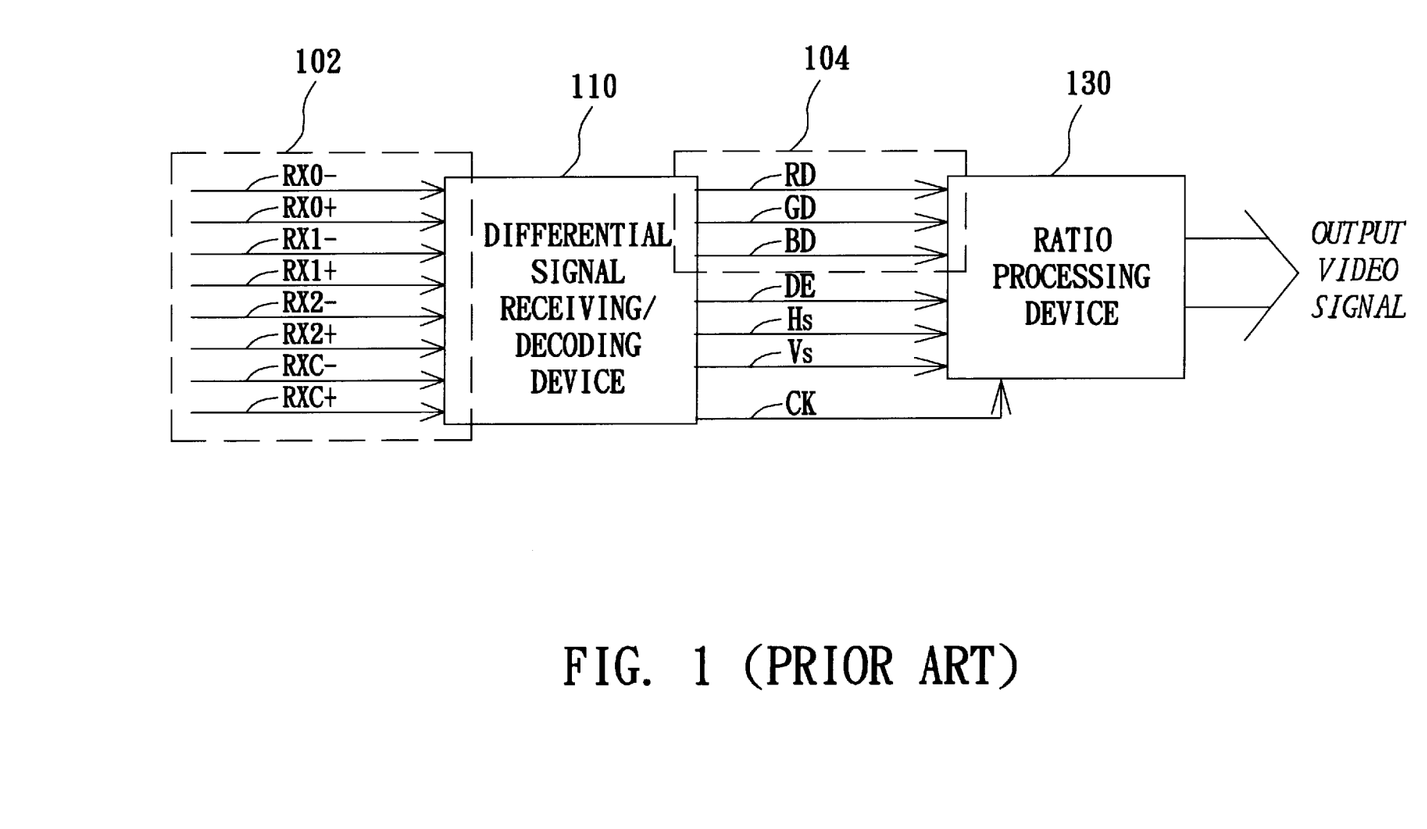
FIG. 1 is a block diagram illustrating the processing of low voltage differential signals in a conventional display.

The circuitry for a display monitor is illustrated in FIG. 1. The display monitor includes a differential signal receiving/decoding device 110 and a ratio processing device. A display signal applied to a display monitor is generally a low voltage differential (LVD) encoded signal. The LVD encoded signal is indicative of signals including three primary color signals, a horizontal synchronous signal Hs, a vertical synchronous signal Vs, a data enable signal DE, and a pixel clock CK. In FIG. 1, the LVD encoded signal 102 includes signals denoted by Rx0−, Rx0+, Rx1−, Rx1+, Rx2−, Rx2+, RxC−, and RxC+. Since the display monitor can only display digital signals, before processing these signals, the display monitor employs a differential signal receiving/decoding device 110 to convert and decode these signals into a digital display signal 104. On receiving the LVD encoded signal 102, the differential signal receiving/decoding device 110 converts and decodes the LVD encoded signal 102 into the digital display signal 104 (i.e., three primary color signals including red (RD), green (GD) and blue (BD) signals), the horizontal synchronous signal Hs, the vertical synchronous signal Vs, the data enable signal DE, the pixel clock signal CK, and so on. When the digital display signal 104 is applied to a ratio processing device 130, an optimal output video signal can be obtained by phase adjustment or interpolation provided by the ratio processing device 130. Since the phase adjustment or interpolation is not the key to the measurement of the full frame size, they will not be described for the sake of brevity. The operation of the display monitor with the horizontal synchronous signal Hs, the vertical synchronous signal Vs, the data enable signal DE, the pixel clock signal CK will be described in the following.

The horizontal synchronous signal Hs, the vertical synchronous signal Vs, the data enable signal DE, and the pixel clock signal CK have units of frequency. The pixel clock signal CK indicates number of pixels to be displayed per second and determines intervals between a pixel to display color and the next one to display color. Upon receiving data of a frame, the display monitor displays colors of pixels of the frame line by line. First, the first pixel of the first line displays color. Second, the second pixel of the first line displays color. The process proceeds in the similar manner until the last pixel of the first line display colors. Next, the next line, such as the second line, display colors in the same manner from the first pixel to the last pixel. Likewise, the process proceeds until the last pixel of the last line displays color. Due to persistence of vision provided by human vision system, all of the pixels on the screen form the required frame. On receiving another frame, the display monitor displays the frame according to the same manner. It should be noted that, after the last pixel of each of the lines displays color, the horizontal synchronous signal Hs causes the scanning of pixels for displaying color to proceed from the first pixel of the next line. Thus, the horizontal synchronous signal Hs determines the number of rows of pixels to be display color per second. In addition, after the pixel of the last column and last row displays color, the vertical synchronous signal causes the scanning of pixels for displaying color to proceed from the pixel at the first column and first row. Thus, the vertical synchronous signal determines the number of frames to be displayed per second. Since human vision system provides persistence of vision, the frames displayed at a rate faster than a threshold value will become continuous movement of objects, i.e., a movie picture. The rate that the display monitor refreshes different frames on the screen is called a refresh rate, i.e., the frequency of the vertical synchronous signal Vs. The refresh rate for generally computer display systems is 60 Hz or above; i.e., the display monitor displays at least 60 frames per second. In the following, the timing relationship of the horizontal synchronous signal Hs, the vertical synchronous signal Vs, the data enable signal DE, and the pixel clock signal CK will be explained.

Figure 2A:
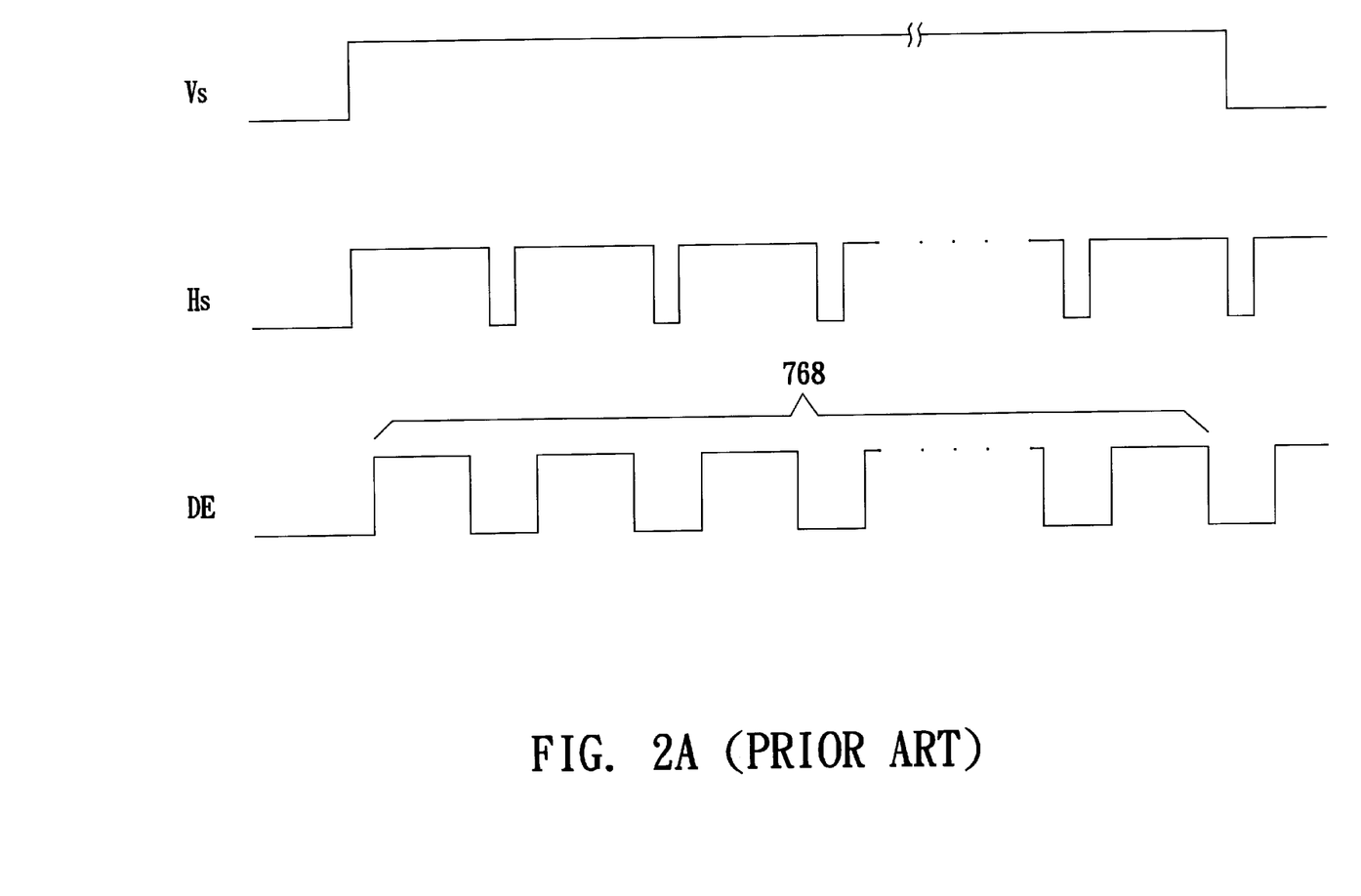
FIG. 2A is a timing diagram illustrating the relationship between the horizontal synchronous signal, the vertical synchronous signal, and data enable signal from the differential signal receiving/decoding device in FIG. 1.
Figure 2B:
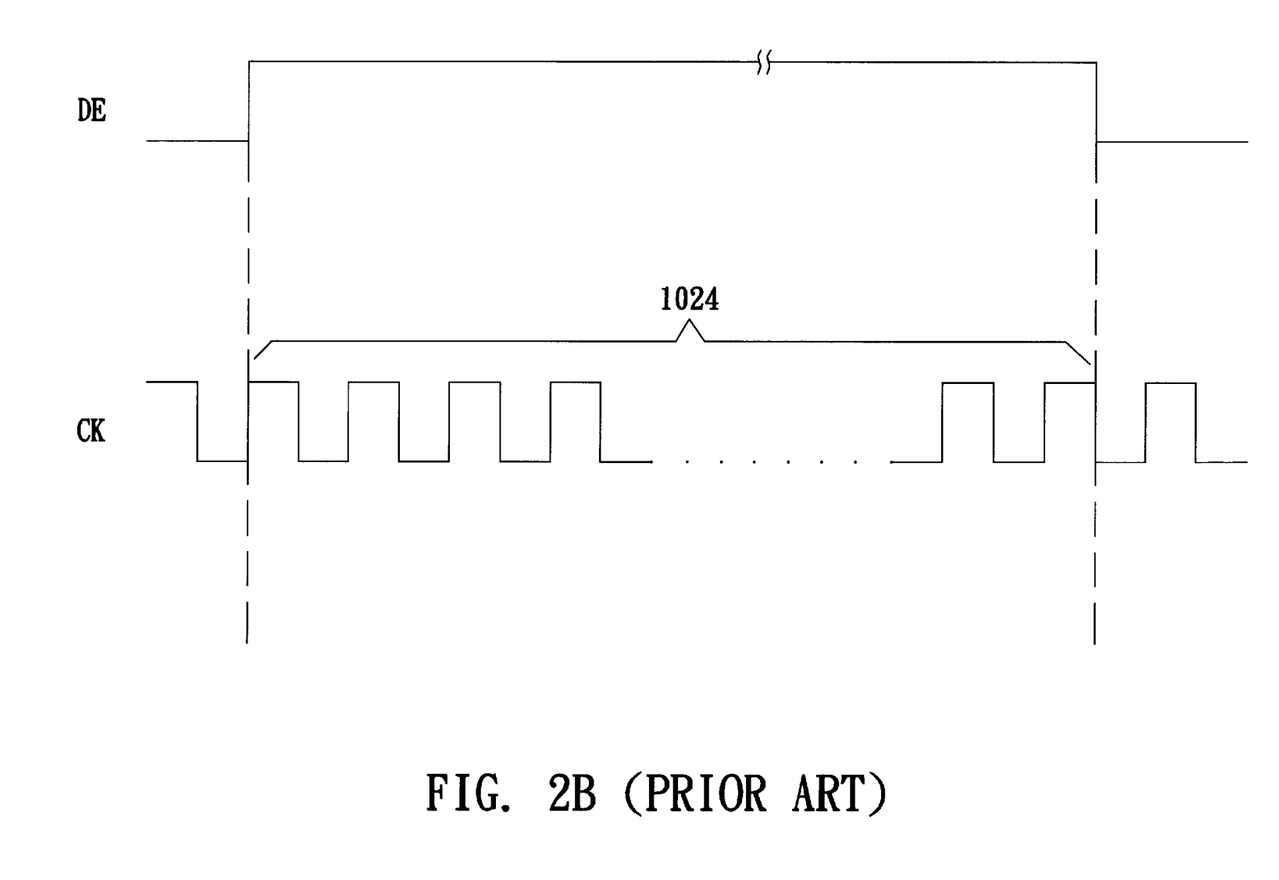
FIG. 2B is a timing diagram illustrating the relationship between the data enable signal in FIG. 2A and the pixel clock signal.

FIG. 2 illustrates the timing relationship of the horizontal synchronous signal Hs, the vertical synchronous signal Vs, and the data enable signal DE. Take the resolution of 1024×768 pixels as an example. For this resolution, the horizontal synchronous signal Hs, the vertical synchronous signal Vs, and the pixel clock signal CK can be 48.36 kHz, 60 Hz, and 65 MHz respectively. During displaying frames, 60 frames are displayed for every second and the Vs signal changes its state only after 768 cycles of the Hs signal because there are 768 rows per frame. In addition, the data enable signal DE determines the period of the display of each row. For each row, 1024 pixels are required to be displayed. Thus, when the enable signal DE is asserted, the display monitor displays colors of 1024 pixels. Having a fixed frequency, the pixel clock signal CK correspondingly oscillates for 1024 cycles during the assertion of the data enable signal DE, as shown in FIG. 2B. The color information of the 1024 pixels is then obtained by sampling the digital display signal through the pixel clock signal CK and the sampled color information is applied to the 1024 pixels during the assertion of the data enable signal DE. Thus, the data enable signal DE can be used to determine the width of the full frame size.

Figure 3:
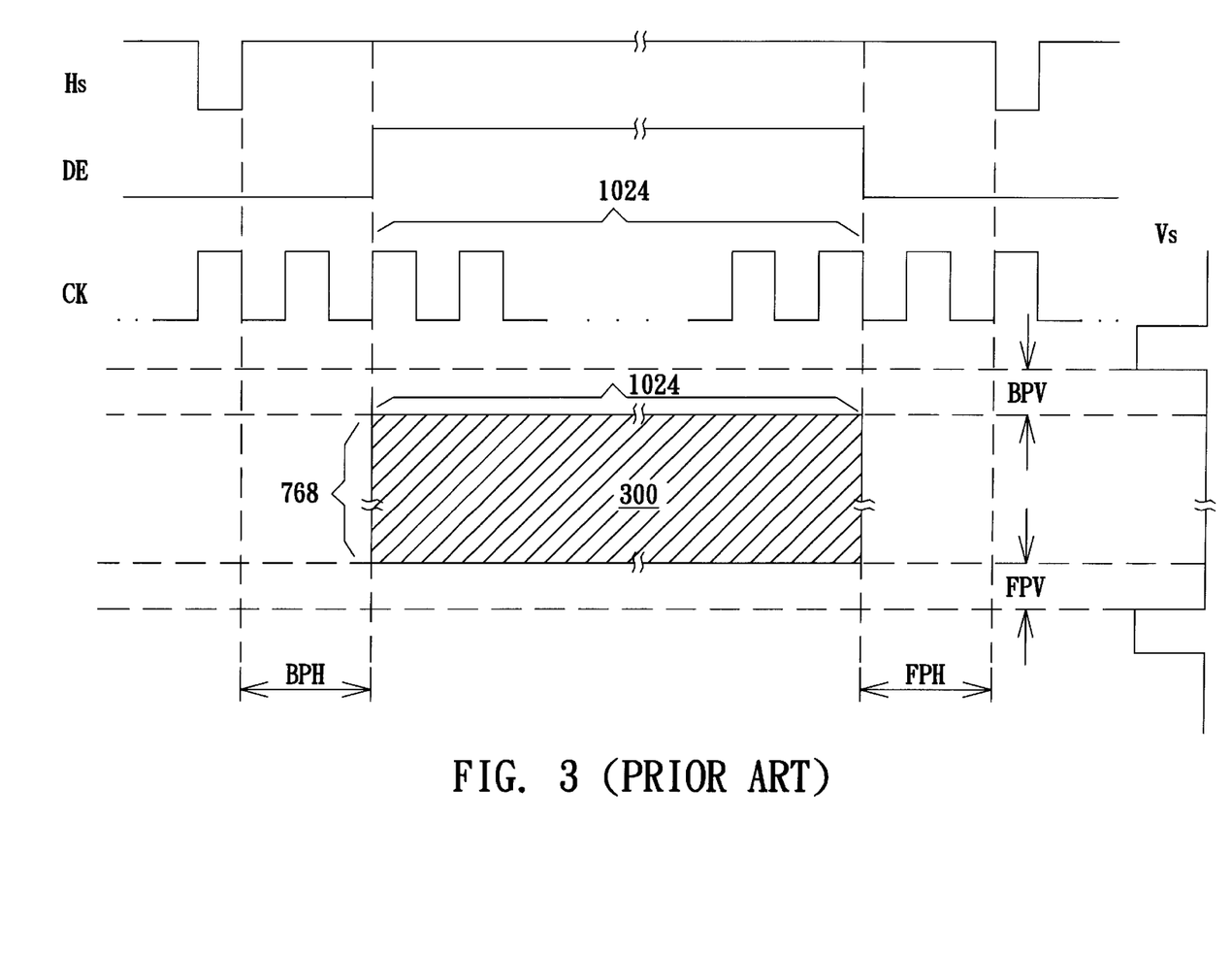
FIG. 3 illustrates the relationship between the display area and the various signals.

FIG. 3 further illustrates how a display area relates to the above-mentioned signals. A display area 300 shown in FIG. 3 indicates an array of 1024×768 pixels. Since the color of each pixel in the display area 300 is displayed by sampling the digital display signal through the pixel clock signal CK, all of the pixels of each row correspond to 1024 pulses of the pulse train of the pixel clock signal CK. As shown in FIG. 3, the length of each row on the display area 300 is determined by the data enable signal DE when the data enable signal DE is asserted. Although the horizontal synchronous signal Hs determines the display of each row on the display area 300, the length of the each row is not determined by the Hs signal. Besides, after the beginning and before the ending of every time interval during which the Hs signal is asserted, there are time intervals during which the Hs signal does not correspond to the display area 300 (i.e., time intervals during which the Hs signal correspond to areas outside the display area 300 and without pixels to be displayed), wherein the time intervals are commonly referred to as a back porch and a front porch respectively. For example, on the left side of the display area 300, a rectangle with dotted borders corresponds to a back porch BPH of the Hs signal. On the right side of the display area 300, a rectangle with dotted borders corresponds to a front porch FPH of the Hs signal. In addition, the vertical synchronous signal Vs similarly has its front and back porches. On the upper side of the display area 300, a region with dotted borders corresponds to an interval during which the Vs signal does not correspond to the display area 300, and is referred to as a back porch BPV of the Vs signal. On the lower side of the display area 300, a region with dotted borders corresponds to another interval for the Vs signal, i.e., a front porch BPV of the Vs signal. It is more important that the name "porch" is accepted through common practice so as to refer to the time intervals for the synchronous (Hs or Vs) signal during which the synchronous signal (Hs or Vs) corresponds to areas outside the display area and without pixels to be displayed.

In order to display frames indicated by the display signal in a proper position on the screen, a conventional display monitor generally adjust the full frame size and position of frames indicated by the display signal applied to the display monitor through a comparison between the display signal and a number of display signal settings provided in the display monitor. To be specific, the frequencies and polarities of the Hs and Vs signals are compared with the display signal settings provided on the display monitor. If the frequency and polarity of the horizontal synchronous signal Hs of the display signal is determined to be identical to one of the display signal settings provided in the display monitor, the display monitor uses the frame adjustment data for the determined display signal setting to adjust the frames indicated by the display signal, thereby displaying the frames in a proper position. However, since various video adapters are available on the market, even if the frequency and polarity of a display signal from a video adapter is determined to be identical to one of the display signal settings provided in the display monitor, timings for the front and back porches for the display signal may be different from that for the determined display signal setting. In this case, if the frame adjustment data for the determined display signal setting are used for frame adjustment, improper adjustment will occur and the frames cannot be displayed on the proper position on the screen, thus degrading the quality of display. For example, the frame may be displayed on the area with deviation or the total number of pixels is incorrect.

For resolving the above problem, control chips for accurately determining the timings of front and back porches for a display signal are developed. However, these control chips employ a method to determine the front and back porches by the first and last pixels of a frame indicated by the display signal, where the first and last pixels of the frame display color other than the black. If non-full-size frames or frames displaying black are applied to the control chip, the determination of the timings of the front and back porches may produce unexpected results, wherein the frames displaying black have no red, green, and blue, such as the black screen in a command mode.

SUMMARY OF THE INVENTION

It is therefore an object of the invention to provide a method for measuring a full frame size from a digital display signal and an apparatus therefor. Regardless of the patterns of the display frames indicated by the digital display signal, the full frame size can be determined accurately, even if the display frame to be display is black or non-full frame.

The invention achieves the above-identified object by providing an apparatus for measuring a full frame size from a digital display signal by a data enable signal, wherein the digital display signal includes a primary color signal with a number of display bits. The apparatus includes a timing control device and a multiplexing device. The timing control device has multiple input terminals and a control signal output terminal. Each of the input terminals is capable of being coupled to a display bit of the primary color signal. The timing control device outputs a control signal through the control signal output terminal. In addition, the control signal is used to indicate whether to make display adjustment. The multiplexing device is coupled to the timing control device, the data enable signal, and an nth bit of the primary color signal. According to the control signal, the multiplexing device selectively applies either the data enable signal or the nth bit of the primary color signal to an nth input terminal of the input terminals of the timing control device, wherein n is not greater than m and m and n are integer greater than zero.

When the actual frames of the digital display signal are to be displayed, the nth bit of the primary color display bit is selected and applied to the timing control device through the multiplexing device. When the timing control device is to perform display adjustment, the timing control device outputs the data enable signal to the multiplexing device and the multiplexing device applies the data enable signal to the timing control device. According to the data enable signal, the timing control device can determine the display parameters, such as the front and back porches, so as to obtain the full frame size and position. After the display adjustment, the timing control device changes the logic state of the data enable signal so that the input terminals of the timing control device receive the primary color signal with its original display bit arrangement, thus allowing the frames indicated by the display signal to be displayed according to the display adjustment.

According to the invention, a method for measuring a full frame size from a display signal by a data enable signal is provided, wherein the display signal includes a primary color signal with m display bits. The method includes the following steps. First, the data enable signal is provided. A substituting display signal is then provided by substituting the data enable signal for an nth bit of the primary color signal. Finally, the full frame size is measured according to the data enable signal, wherein n is not greater than m and m and n are integer greater than zero.

As mentioned above, the data enable signal is substituted for one display bit of the primary color signal. According to the invention, the data enable signal can be substituted for another single display bit or multiple display bits in different manner so as to measure the display parameters. For example, the data enable signal can be substituted for another display bit of the primary color signal, or a number of the display bits of the primary color signal, or a single or multiple display bits of another primary color signal that is applied to the timing control device.

Other objects, features, and advantages of the invention will become apparent from the following detailed description of the preferred but non-limiting embodiments. The following description is made with reference to accompanying drawings.

DETAILED DESCRIPTION OF THE INVENTION

In order to measure the size of display frames from a display signal according to the invention, a data enable signal is substituted for a single or multiple display bits of the digital display signal, and the digital display signal after the display bit substitution is fed into a timing control device for measuring the size of the display frame. Since the data enable signal is asserted only during the assertion of the horizontal synchronous signal so as to indicate a frame to be displayed, even though the frame, indicated by the display signal, corresponds to a total black frame or a non-full frame, the full frame size along with corresponding display parameters such as the display frame position and resolution can be accurately determined after the display bit substitution. Through the measurement of the full frame size, adjustment of display for the display signal can then be performed. Although the measurement of the full frame size can be done at any time, it should be noted that the digital display signal with the display bit substitution does not correspond to actual images to be displayed. Thus, in order to maintain the display quality unaffected after the measurement of the full frame size, the display signal after the display bit substitution should be restored to its original display bit arrangement after the measurement of the full frame size and the adjustment of display has done. Thus, in practice, a multiplexing device can be employed to perform switching of signals so as to implement the display bit substitution and the restoration of the display signal before and after the adjustment respectively.

Figure 4A:
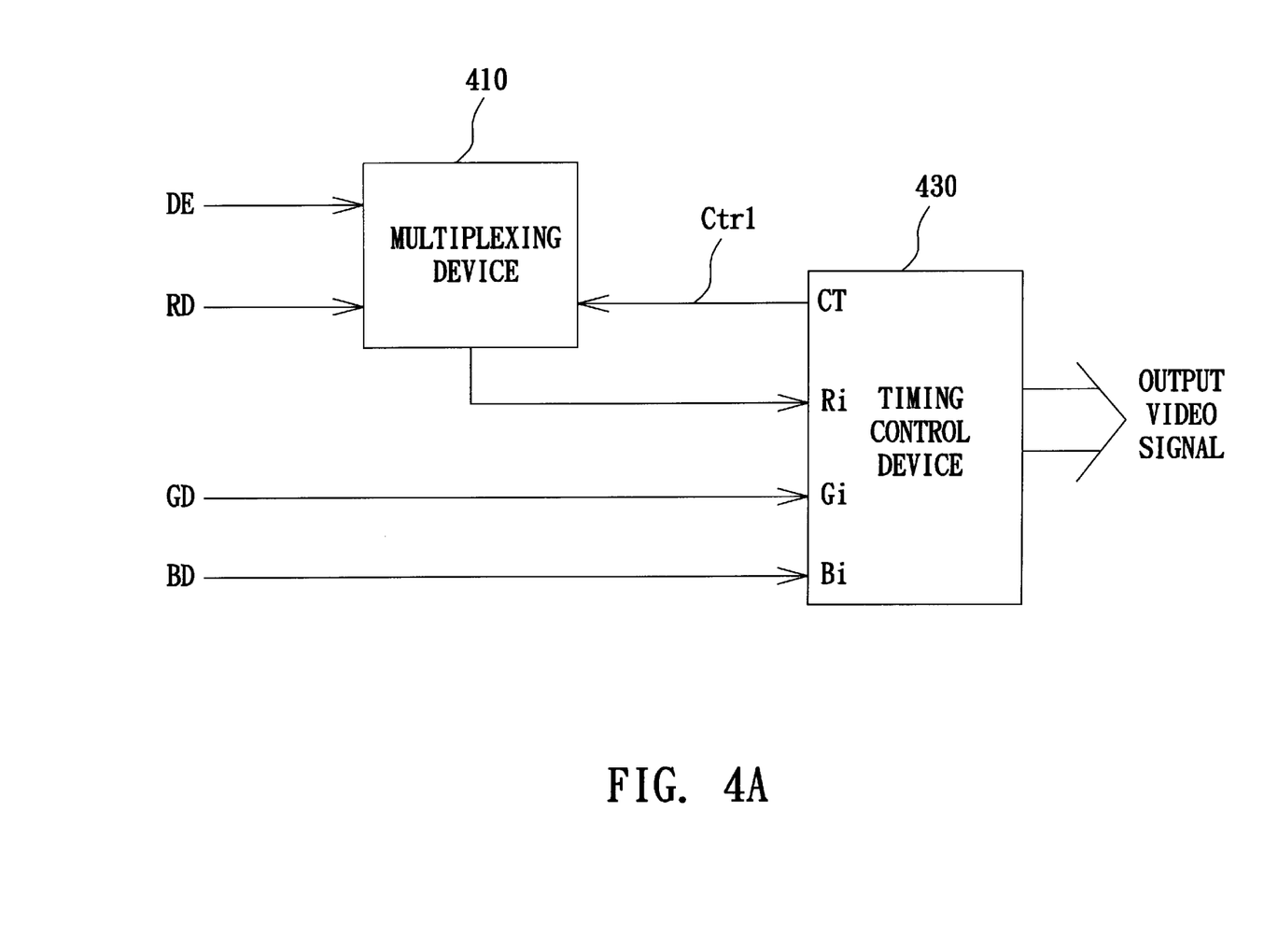
FIG. 4A is a block diagram of an apparatus for measuring a full frame size according to a preferred embodiment of the invention.

FIG. 4A illustrates an apparatus for measuring a full frame size according to a preferred embodiment of the invention. The apparatus includes a multiplexing device 410 and a timing control device 430. The timing control device 430 has input ports Ri, Gi, Bi, and a control signal terminal CT. The input ports Ri, Gi, Bi are used to receive three primary color signals, namely, a red signal RD, a green signal GD, and a blue signal BD, respectively. When the three primary color signals are applied to the timing control device 430, the timing control device 430 can determine parameters for display, such as the full frame size, display frame position, and front and back porches for signals. The timing control device 430 can be a timing control chip, such as a chip PW164-20R of Pixelworks incorporation. It should be noted that if each of the primary color signals is represented by m display bits, each of the input ports of the timing control device 430 is required to provide m input terminals correspondingly. Take a 24-bit display signal as example. Each of its primary color signals, i.e., red signal RD, green signal GD, and blue signal BD, has respective primary color data of 8 display bits, so that each of the input ports Ri, Gi, and Bi has 8 input terminals associated with the 8 display bits of the corresponding primary color signal. The relationship between the display bits and input terminals will be described later in the detailed description. Further, in order to use the data enable signal in substitution for display bits of the display signal and to restore the display bit arrangement after the display adjustment, the multiplexing device 410 is coupled to the timing control device 430 and employed to perform switching between two signals, i.e., the data enable signal and some display bit(s) of the display signal for which the data enable signal is substituted. In the embodiment, the switching between the data enable signal DE and a display bit of the red signal will be illustrated.

Figure 4B:
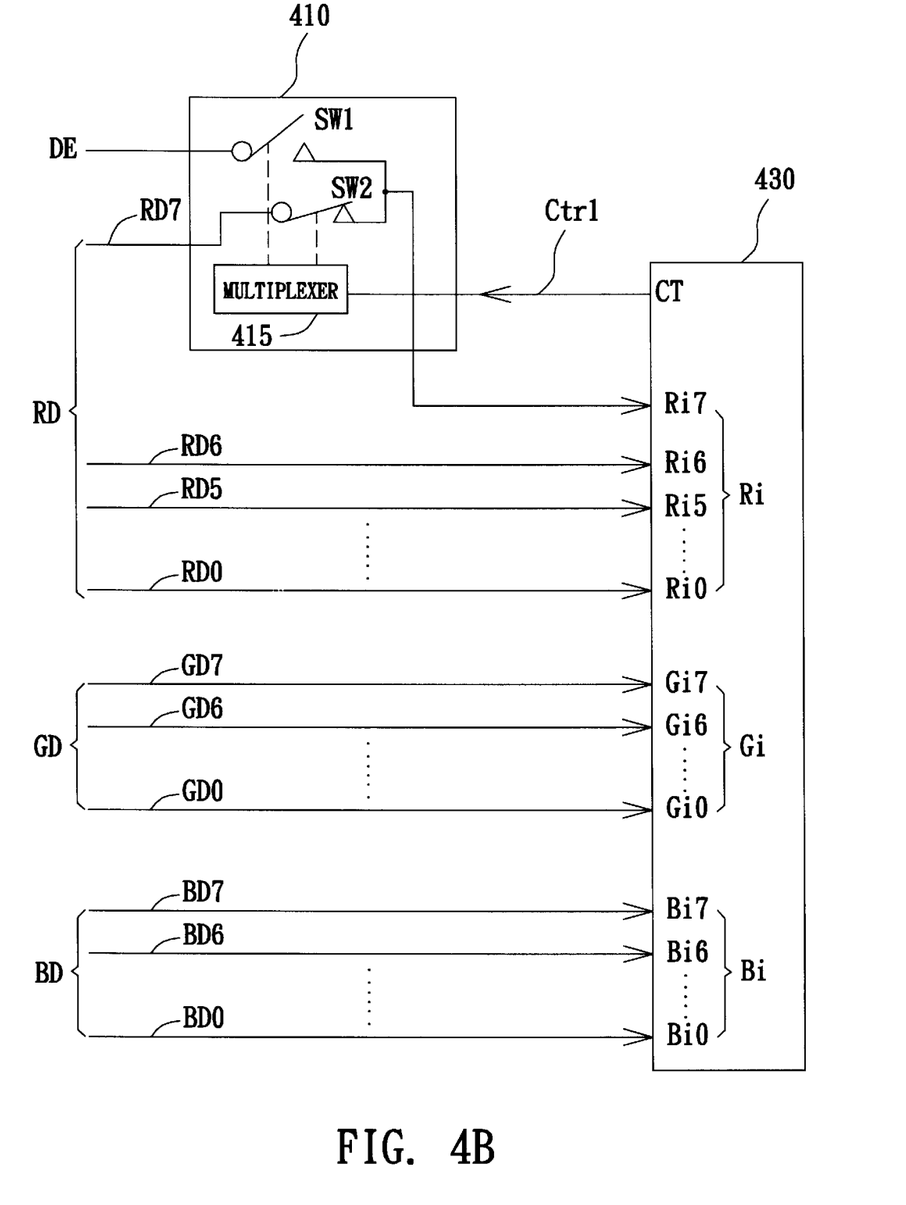
FIG. 4B illustrates a structure of the apparatus shown in FIG. 4A.

FIG. 4B illustrates a structure of the apparatus in FIG. 4A, wherein the relationship between the display bits and input terminals are detailed. The red signal RD consists of 8 display bits, namely, RD0, RD1, . . . , and RD7. Similarly, the green signal GD consists of 8 display bits, namely, GD0, GD1, . . . , and GD7, while the blue signal BD also consists of 8 display bits, namely, BD0, BD1, . . . , and BD7. In FIG. 4B, each of the display bits is coupled to an input terminal of the corresponding input port. For example, the display bit RD6 is coupled to the input terminal Ri6 of the input port Ri, while the display bit GD7 is coupled to the input terminal Gi7 of the input port Gi. In the connection of the signals and input terminals shown in FIG. 4B, the data enable signal DE is employed to substitute for the highest display bit RD7 of the red signal RD so as to measure the full frame size. In practice, the data enable signal DE can be substituted for another single display bit or multiple display bits in different manner so as to measure the display parameters. For example, the data enable signal DE can be substituted for another display bit of the red signal RD, or a number of the display bits of the red signal RD, or a single or multiple display bits of another primary color signal. Since these examples can be readily obtained according to the embodiment shown in FIG. 4B, they will not be described for the sake of brevity.

For the measurement of the full frame size, switching between the data enable signal DE and a display bit of the red signal is performed. In FIG. 4B, when the display signal is applied to the timing control device 430, the timing control device 430 outputs a control signal Ctrl through a control signal terminal CT. The control signal Ctrl is then applied to a multiplexer 415 of the multiplexing device 410. In response to the logic state of the control signal Ctrl, e.g., logic 1 state, the multiplexer 415, selectively, e.g., closes (turns on) a switch SW1 and opens (turns off) a switch SW2 (off), so that the data enable signal DE is substituted for the eighth display bit of the read signal RD, i.e., display bit RD7, and is applied to the input terminal Ri7. After that, the timing control device 430 starts to perform the measurement of display parameters, such as frond and back porches, through its calculation operations so as to determine the full frame size, position and so on. Thus, according to the full frame size and position, the display module (not shown) coupled to the timing control device 430 can display frames according to the display signal properly. It should be noted that when the data enable signal DE is applied to the input terminal Ri7, the determination of the full frame size can be made regardless of the pattern of the display frame indicated by the display signal even though the display signal is indicative of an entire black frame or a non-full frame.

After adjusting the display, the timing control device 430 can change the logic state of the control signal Ctrl, e.g., from logic 1 to logic 0. The multiplexing device 415 then opens (turns off) the switch SW1 and closes (turns on) the switch SW2 so that the eighth display bit of the red signal RD, i.e., display bit RD7, is fed into the input terminal Ri7. In this way, the timing control device 430 receives the actual display bits of the display signal. In addition, the timing control device 430 has made the adjustment to the display geometry so that the images indicated by the display signal are to be displayed with an optimal size and position. Thus, optimal display effects can be obtained.

Further, when changes occurs in the inputs to the timing control device 430, such as the horizontal synchronous signal, vertical synchronous signal, or polarity signal, the timing control device 430 can perform the above-described measurement of the display parameters and display adjustment so as to maintain optimal display quality.

It should be noted that, for the measurement of the full frame size, the data enable signal DE is employed to substitute, preferably, for the highest display bit of one of the primary color signals, e.g., the display bit RD7, GD7, or BD7. It is because the highest display bit is usually employed regardless of how many numbers of bits being used for different color resolutions, e.g., 24-bit or 18-bit color resolutions, but the lower display bit(s) may be abandoned for some color resolution. If the data enable signal DE is substituted for a display bit which is not the highest display bit, the display bit may be unused as the display signal is used in a lower resolution. Therefore, for a display in support for various color resolutions, it is preferred coupling the data enable signal DE to the highest display bit. Although the above-described preferred embodiment is illustrated with a color display, the invention can be also apply to monochrome displays without departing from the spirit of the invention.

As disclosed above, the method and apparatus for measuring a full frame size through the data enable signal are capable of accurately determining a full frame size from a display signal, even if images indicated by the display signal correspond to total black frames or non-full frames, thus allowing an optimal display quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for measuring a full frame size from a digital display signal by a data enable signal, the digital display signal including a primary color signal, the primary color signal having m display bits, the method comprising the steps of:

providing the data enable signal;

providing a substituting display signal by substituting the data enable signal for an nth bit of the primary color signal; and measuring the full frame size according to the substituting display signal, wherein n is not greater than m and m and n are integer greater than zero.

2. The method of claim 1, wherein the primary color signal is red signal.

3. The method of claim 1, wherein the primary color signal is green signal.

4. The method of claim 1, wherein the primary color signal is blue signal.

5. The method of claim 1, wherein m is set to eight.

6. The method of claim 1, wherein n is set to eight.

7. The method of claim 1, wherein m is set to six.

8. The method of claim 1, wherein n is set to six.

9. An apparatus for measuring a full frame size from a digital display signal by a data enable signal, the digital display signal including a primary color signal, the primary color signal having m display bits, the apparatus comprising:

a timing control device, including m input terminals and a control signal output terminal, wherein the m input terminals are capable of being coupled to the m display bits, and the timing control device outputs a control signal through the control signal output terminal; and a multiplexing device, coupled to the timing control device, the data enable signal and an nth bit of the primary color signal, the multiplexing device, according to the control signal, selectively applying either the data enable signal or the nth bit of the primary color signal to an nth input terminal of the m input terminals of the timing control device, wherein n is not greater than m and m and n are integer greater than zero.

10. The apparatus of claim 9, the timing control device is a timing control chip.

11. The apparatus of claim 10, the timing control device is PW164-20R.

12. The apparatus of claim 9, wherein the primary color signal is red signal.

13. The apparatus of claim 9, wherein the primary color signal is green signal.

14. The apparatus of claim 9, wherein the primary color signal is blue signal.

15. The apparatus of claim 9, wherein m is set to eight.

16. The apparatus of claim 9, wherein n is set to eight.

17. The apparatus of claim 9, wherein m is set to six.

18. The apparatus of claim 9, wherein n is set to six.

* * * * *